(12) United States Patent
Chen et al.

(10) Patent No.: US 11,378,734 B1
(45) Date of Patent: Jul. 5, 2022

(54) ELECTRONIC DEVICE AND INDICATOR MODULE THEREOF

(71) Applicant: Wistron NeWeb Corp., Hsinchu (TW)

(72) Inventors: Yan-Da Chen, Hsinchu (TW);
Ying-Yen Lu, Hsinchu (TW);
Tzu-Heng Huang, Hsinchu (TW);
Jun-Wei Wang, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 0 days.

(21) Appl. No.: 17/493,971

(22) Filed: Oct. 5, 2021

(30) Foreign Application Priority Data

Jan. 28, 2021 (TW) .................................. 110103191

(51) Int. Cl.
*F21V 8/00* (2006.01)
(52) U.S. Cl.
CPC ........... *G02B 6/0068* (2013.01); *G02B 6/009* (2013.01)
(58) Field of Classification Search
CPC .............................. G02B 6/0068; G02B 6/009
See application file for complete search history.

(56) References Cited

U.S. PATENT DOCUMENTS

| | | | |
|---|---|---|---|
| 11,169,375 B2 | 11/2021 | Nambara | |
| 11,294,228 B2 | 4/2022 | Nakamura | |
| 2012/0007136 A1* | 1/2012 | Kim | H05K 3/3452 |
| | | | 257/E33.066 |
| 2019/0257490 A1* | 8/2019 | Herlin | G02B 6/0061 |

FOREIGN PATENT DOCUMENTS

| | | |
|---|---|---|
| CN | 108901197 A | 11/2018 |
| CN | 109563983 A | 10/2020 |

* cited by examiner

*Primary Examiner* — Mary Ellen Bowman
(74) *Attorney, Agent, or Firm* — McClure, Qualey & Rodack, LLP

(57) ABSTRACT

An indicator module is provided, including a device housing, a circuit board, a plurality of light sources, a dividing structure, and a homogenizing plate. The device housing includes a transparent window. The circuit board is disposed in the device housing. The light sources are disposed on the circuit board, wherein each light source is adapted to provide a light beam. The dividing structure is disposed in the device housing, wherein the dividing structure defines a plurality of divided spaces, and the divided spaces respectively correspond to the light sources. The homogenizing plate is disposed in the device housing. The homogenizing plate corresponds to the divided spaces, wherein an air gap is formed between the transparent window and the homogenizing plate. The light beam enters the divided space from the light source, passes through the homogenizing plate and the air gap, and is emitted through the transparent window.

18 Claims, 6 Drawing Sheets

ELECTRONIC DEVICE AND INDICATOR MODULE THEREOF

CROSS REFERENCE TO RELATED APPLICATIONS

This Applications claims priority of Taiwan Patent Application No. 110103191, filed on Jan. 28, 2021, the entirety of which is incorporated by reference herein.

BACKGROUND OF THE INVENTION

Field of the Invention

The present invention relates to an electronic device, and in particular to an electronic device with indicator module.

Description of the Related Art

Electronic devices often have indicator modules to show the status of the battery power or the signal transmission. Conventionally, the indicator module has a plurality of light sources (for example, LEDs). The light sources can be lighted up respectively to form a light strip with an indication function. Due to the illumination characteristic of LEDs, there are dark lines or bright lines formed in the light strip. The dark lines or bright lines detract from the appearance of the light strip, and decrease the aesthetic feeling of the electronic device.

BRIEF SUMMARY OF THE INVENTION

Embodiments of the invention are provided to address the aforementioned difficulty.

In one embodiment, an indicator module is provided. The indicator module includes a device housing, a circuit board, a plurality of light sources, a dividing structure, and a homogenizing plate. The device housing includes a transparent window. The circuit board is disposed in the device housing. The light sources are disposed on the circuit board, wherein each light source is adapted to provide a light beam. The dividing structure is disposed in the device housing, wherein the dividing structure defines a plurality of divided spaces, and the divided spaces correspond to the respective light sources. The homogenizing plate is disposed in the device housing. The homogenizing plate corresponds to the divided spaces. An air gap is formed between the transparent window and the homogenizing plate. The light beam enters the divided space from the light source, passes through the homogenizing plate and the air gap, and is emitted through the transparent window.

In one embodiment, the dividing structure comprises a plurality of dividing walls, the dividing walls define the dividing spaces, the homogenizing plate covers the dividing walls, the homogenizing plate comprises a light entering surface and a light emitting surface, the light entering surface is parallel to the light emitting surface, the light emitting surface faces the transparent window, and the light entering surface faces the light sources.

In one embodiment, the air gap is between 1 mm and 3 mm.

In one embodiment, a distance is formed between the homogenizing plate and the light sources, and the distance is between 3 mm and 8 mm.

In one embodiment, the homogenizing plate is disposed on the circuit board, the homogenizing plate comprises a light entering surface and a light emitting surface, the light entering surface is perpendicular to the light emitting surface, the light emitting surface faces the transparent window, and the light entering surface faces the light sources In one embodiment, the dividing structure is embedded in the homogenizing plate, the homogenizing plate comprises a plurality of guiding areas and an emitting area, each guiding area is located in one of the divided spaces, the emitting area corresponds to the transparent window, and the light beam enters the guiding area inside the divided space from the light source, is emitted from the light emitting surface of the emitting area, passes through the air gap, and is emitted via the transparent window.

In one embodiment, the homogenizing plate is located between the transparent window and the circuit board.

In one embodiment, the circuit board is located between the transparent window and at least a portion of the homogenizing plate, the circuit board comprises a circuit board opening, and the light beam enters the guiding area inside the divided space from the light source, is emitted from the light emitting surface of the emitting area, passes through the air gap, and is emitted via the transparent window.

In one embodiment, the homogenizing plate comprises a plurality of reflective protrusions, and the reflective protrusions are formed in the emitting area.

In one embodiment, a predetermined distance is formed between the emitting area and the light sources, and the predetermined distance is between 3 mm and 8 mm.

In one embodiment, an electronic device is provided. The electronic device includes a device housing, a circuit board, a plurality of light sources, a bracket and a homogenizing plate. The device housing comprises a transparent window. The circuit board is disposed in the device housing. The light sources are disposed on the circuit board, wherein each light source is adapted to provide a light beam. The bracket is disposed in the device housing and is connected to the device housing, wherein the bracket defines a plurality of divided spaces, and the divided spaces respectively correspond to the light sources. The homogenizing plate is disposed in the device housing. The homogenizing plate corresponds to the divided spaces. An air gap is formed between the transparent window and the homogenizing plate. The light beam enters the divided space from the light source, passes through the homogenizing plate and the air gap, and is emitted through the transparent window.

In one embodiment, the bracket comprises at least one positioning post, the homogenizing plate comprises at least one positioning hole, and the positioning post passes through the positioning hole.

In one embodiment, the bracket comprises a bracket abutting surface, the positioning post is formed on the bracket abutting surface, the homogenizing plate comprises a plate abutting area, the positioning hole is formed on the plate abutting area, and the bracket abutting surface abuts the plate abutting area.

Utilizing the indicator module of the embodiment of the invention, the design of the homogenizing plate, the divided space and the air gap controls the illumination range of each light source. The bright line and dark line in the light strip are reduced. The appearance of the light strip of the indicator module is improved, and the aesthetic feeling of the product (an electronic device) is raised.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
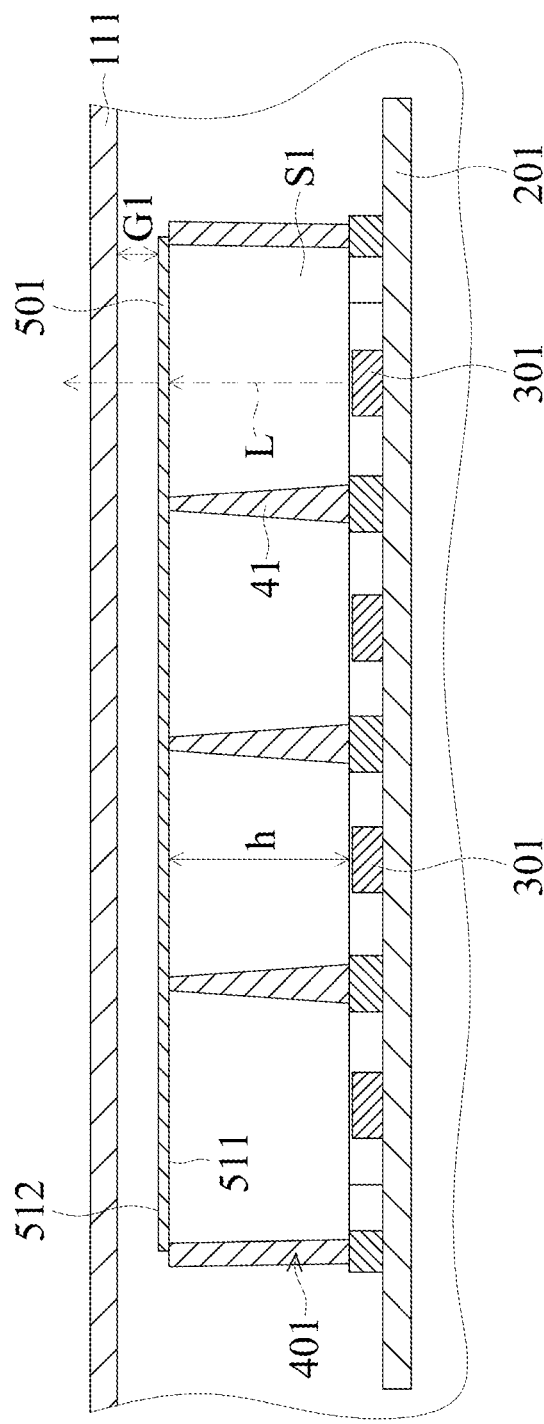
FIG. 1 shows an indicator module of a first embodiment of the invention.
Figure 2A:
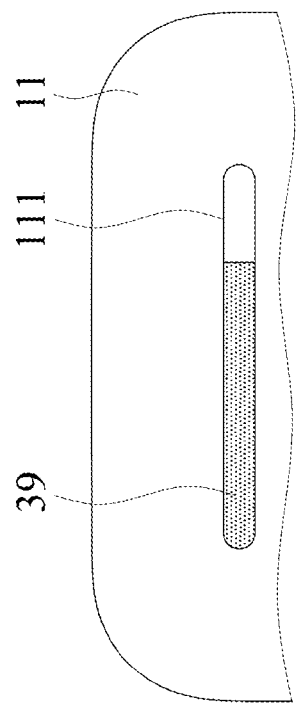
FIGS. 2A~2D show the operation of the indicator module of the embodiment of the invention.
Figure 2C:
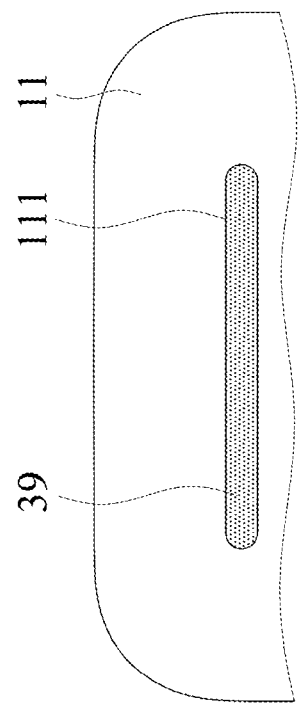
Figure 2B:
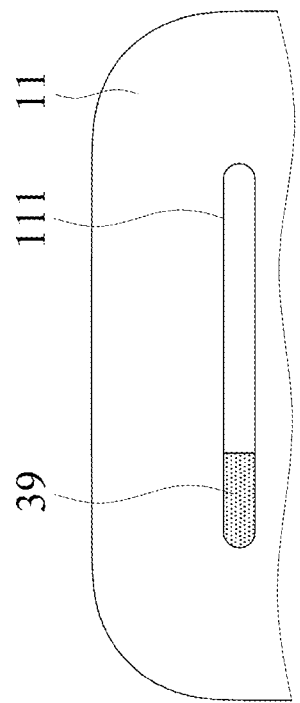
Figure 2D:
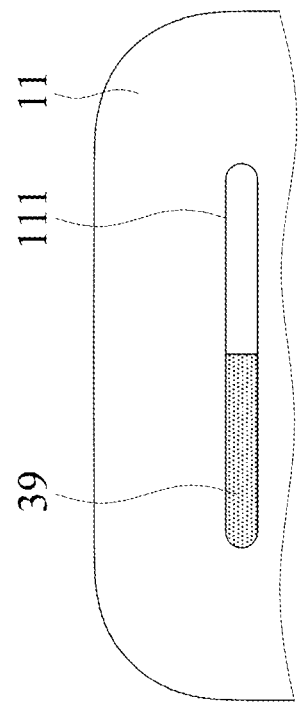

FIG. 1 shows an indicator module of a first embodiment of the invention. With reference to FIG. 1, the indicator module M1 of the first embodiment of the invention includes a device housing (not shown), a circuit board 201, a plurality of light sources 301, a dividing structure 401 and a homogenizing plate 501. The device housing includes a transparent window 111. The circuit board 201 is disposed in the device housing. The light sources 301 are disposed on the circuit board 201, wherein each light source 301 is adapted to provide a light beam L. The dividing structure 401 is disposed in the device housing, wherein the dividing structure 401 defines a plurality of divided spaces S1. The divided spaces S1 correspond to the respective light sources 301. The homogenizing plate 501 is disposed in the device housing. The homogenizing plate 501 corresponds to the divided spaces S1. An air gap G1 is formed between the transparent window 111 and the homogenizing plate 501. The light beam L enters the divided space S1 from the light source 301, passes through the homogenizing plate 501 and the air gap G1, and is emitted through the transparent window 111.

With reference to FIG. 1, in one embodiment, the dividing structure 401 comprises a plurality of dividing walls 41. The dividing walls 41 define the dividing spaces S1. The homogenizing plate 501 covers the dividing walls 41. The homogenizing plate 501 comprises a light entering surface 511 and a light emitting surface 512. The light entering surface 511 is parallel to the light emitting surface 512. The light emitting surface 512 faces the transparent window 111. The light entering surface 511 faces the light sources 301. In one embodiment, the homogenizing plate 501 contacts upper ends of the dividing walls 41.

With reference to FIG. 1, in one embodiment, the air gap G1 is between 1 mm and 3 mm.

With reference to FIG. 1, in one embodiment, a distance h is formed between the homogenizing plate 501 and the light sources 301, and the distance h is between 3 mm and 8 mm.

FIGS. 2A~2D show the operation of the indicator module of the embodiment of the invention. With reference to FIGS. 2A~2D, the indicator module of the embodiment of the invention is utilized to indicate the status (for example, battery power) of an electronic device. The indicator module shows a light strip 39 via the transparent window 111 of the cover 11 of the device housing. With reference to FIGS. 2A-2D, the length of the light strip 39 is changed with the status (for example, battery power) of the electronic device by changing the number of the lighting up light sources. Due to the homogenizing means such as the homogenizing plate 501, there is no bright line or dark line in the light strip 39.

Utilizing the indicator module of the embodiment of the invention, the design of the homogenizing plate, the divided space and the air gap controls the illumination range of each light source. The bright line and dark line in the light strip are reduced. The appearance of the light strip of the indicator module is improved, and the aesthetic feeling of the product (an electronic device) is raised.

Figure 3:
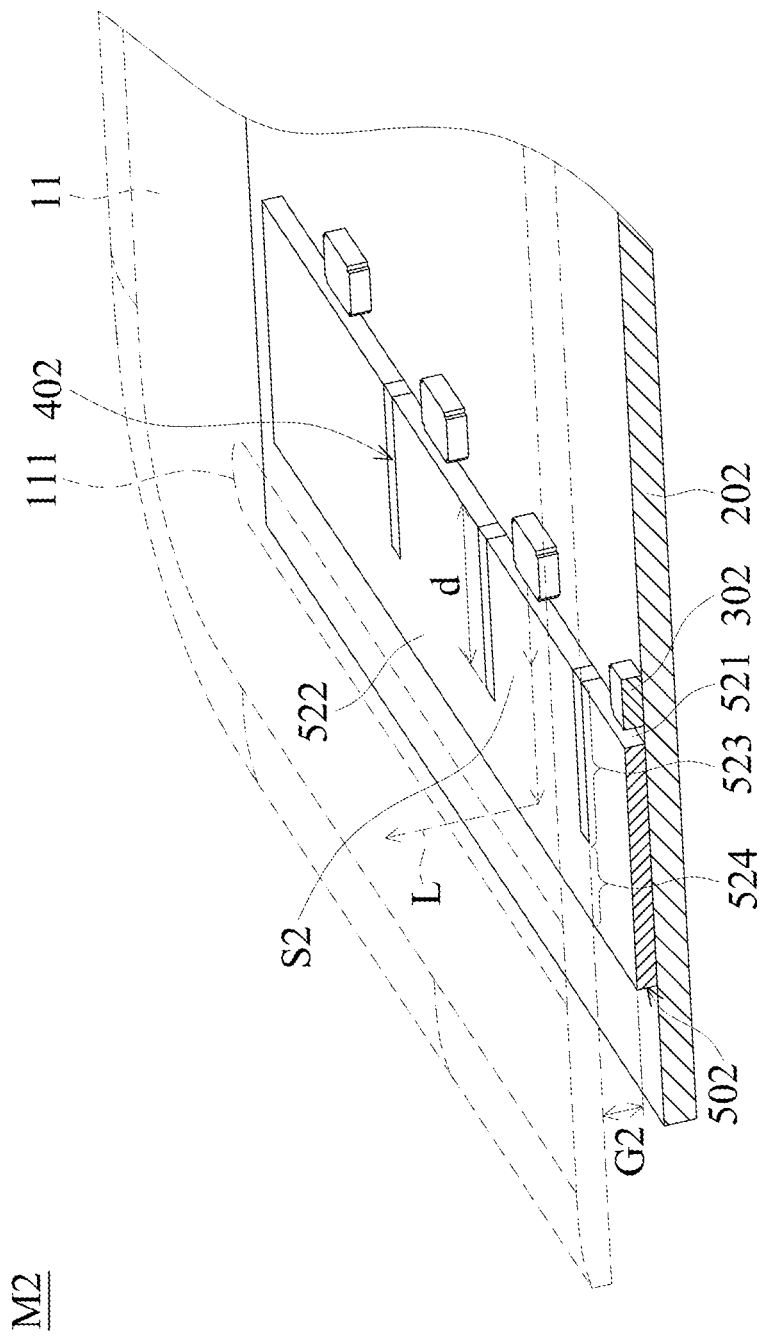
FIG. 3 is a cross sectional view of the indicator module of a second embodiment of the invention.

FIG. 3 is a cross sectional view of the indicator module of a second embodiment of the invention. With reference to FIG. 3, in the indicator module M2 of the second embodiment of the invention, the homogenizing plate 502 is disposed on the circuit board 202. The homogenizing plate 502 comprises a light entering surface 521 and a light emitting surface 522. The light entering surface 521 is perpendicular to the light emitting surface 522. The light emitting surface 522 faces the transparent window 111 of the cover 11 of the device housing, and the light entering surface 521 faces the light sources 302.

With reference to FIG. 3, in this embodiment, the dividing structure 402 is embedded in the homogenizing plate 502. The homogenizing plate 502 comprises a plurality of guiding areas 523 and an emitting area 524. Each guiding area 523 is located in one of the divided spaces S2. The emitting area 524 corresponds to the transparent window 111. The light beam L enters the guiding area 523 inside the divided space S2 from the light source 302, emitted from the light emitting surface 522 of the emitting area 524, passing through the air gap G2, and is emitted via the transparent window 111 of the cover 11 of the device housing.

With reference to FIG. 3, in this embodiment, the dividing structure 402 can be made of opaque sheets, which are embedded in the homogenizing plate 502.

With reference to FIG. 3, in one embodiment, the homogenizing plate 502 is located between the transparent window 111 and the circuit board 202.

With reference to FIG. 3, in one embodiment, a predetermined distance d is formed between the emitting area 524 and the light sources 302, and the predetermined distance d is between 3 mm and 8 mm. The air gap G2 is between 1 mm and 3 mm.

With reference to FIG. 3, in one embodiment, the homogenizing plate 502 comprises a plurality of reflective protrusions (not shown), and the reflective protrusions (not shown) are formed in the emitting area 524. The reflective protrusions change the direction of the light beams L (in FIG. 3, the direction of the light beams L is changed from the horizontal direction to the vertical direction).

With reference to FIG. 3, in the indicator module M2 of the second embodiment of the invention, the light beam enters the homogenizing plate 502 via a lateral side (light entering surface 521) thereof, and the size of the indicator module M2 can be reduced.

Figure 4:
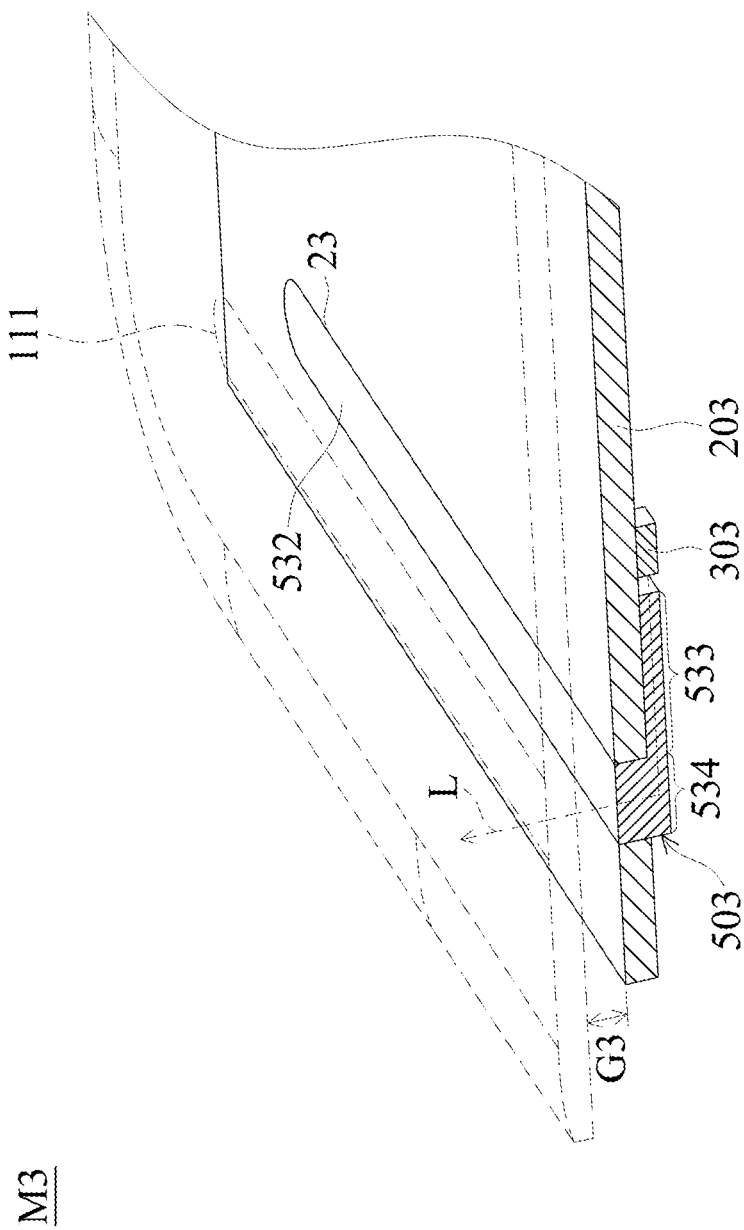
FIG. 4 is a cross sectional view of the indicator module of a third embodiment of the invention.

FIG. 4 is a cross sectional view of the indicator module of a third embodiment of the invention. With reference to FIG. 4, in the indicator module M3 of the third embodiment of the invention, the circuit board 203 is located between the transparent window 111 and at least a portion of the homogenizing plate 503. The circuit board 203 comprises a circuit board opening 23. The light beam L enters the guiding area 533 inside the divided space from the light source 303, is emitted from the light emitting surface 532 of the emitting area 534, passes through the air gap G3, and is emitted via the transparent window 111. In this embodiment, the homogenizing plate 503 is partially inserted into the circuit board opening 23. In the indicator module M3 of the third embodiment of the invention, the light beam enters the homogenizing plate 503 via a lateral side thereof, and the size of the indicator module M3 can be reduced. Additionally, the light sources 303 and the homogenizing plate 503 are disposed on the lower side of the circuit board 203, and the available element mounting space on the upper side of the circuit board 203 can be increased.

Figure 5A:
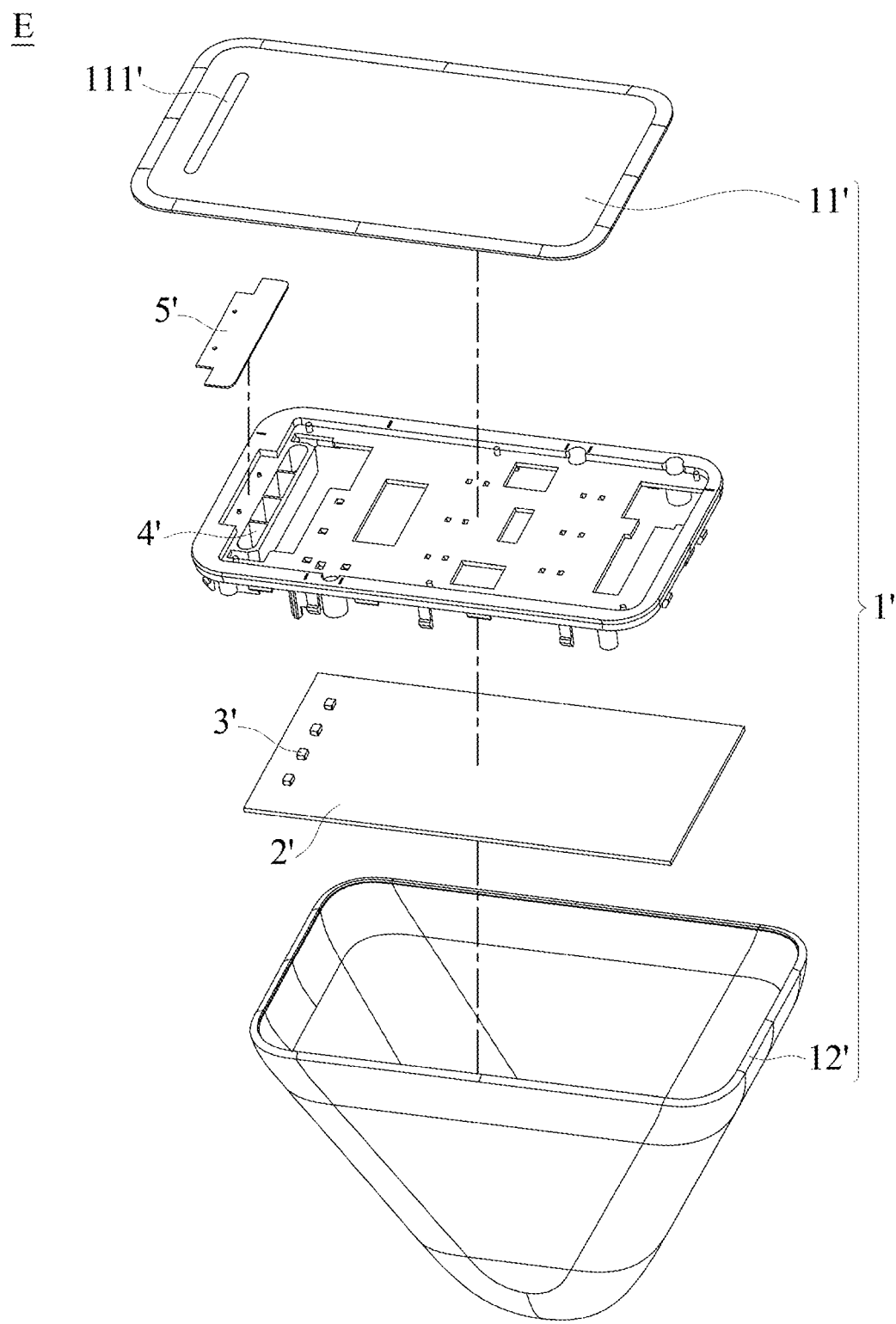
FIG. 5A shows an electronic device of the embodiment of the invention.

FIG. 5A shows an electronic device of the embodiment of the invention. With reference to FIG. 5A, the indicator module of the embodiment of the invention can be utilized to the electronic device E. The electronic device E includes a device housing 1', a circuit board 2', a plurality of light sources 3', a bracket 4' and a homogenizing plate 5'. The device housing 1' comprises a cover 11' and a housing body 12'. The cover 11' has a transparent window 111'. The circuit board 2' is disposed in the device housing 1'. The light sources 3' are disposed on the circuit board 2'. Each light source 3' is adapted to provide a light beam. The bracket 4' is disposed in the device housing 1' and is connected to the device housing 1'. The bracket 4' defines a plurality of divided spaces, and the divided spaces respectively correspond to the light sources. The homogenizing plate 5' is disposed in the device housing 1'. The homogenizing plate 5' corresponds to the divided spaces. An air gap is formed between the transparent window 111' and the homogenizing plate 5'. The light beam enters the divided space from the light source 3', passes through the homogenizing plate 5' and the air gap, and is emitted through the transparent window 111'.

In one embodiment, the cover 11' can be made of glass or transparent plastic. The cover 11' can be coated with ink except the transparent window 111'.

In one embodiment, the bracket 4' can be utilized as the dividing structure mentioned above, and also can support other electronic elements inside the electronic device E.

Figure 5B:
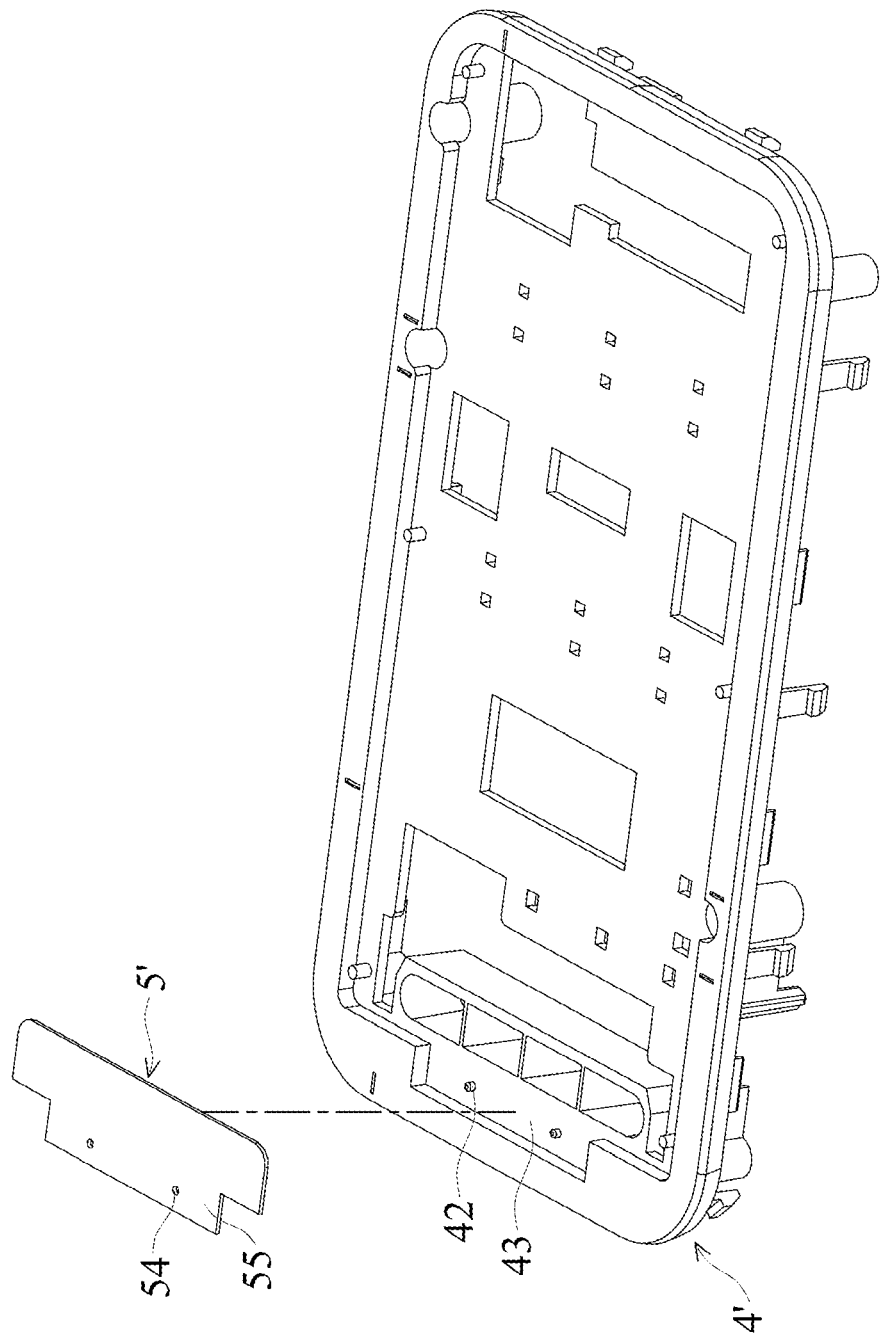
FIG. 5B shows the details of the bracket and the homogenizing plate of the embodiment of FIG. 5A.

FIG. 5B shows the details of the bracket and the homogenizing plate of the embodiment of FIG. 5A. With reference to FIG. 5B, in one embodiment, the bracket 4' comprises at least one positioning post 42. The homogenizing plate 5' comprises at least one positioning hole 54, and the positioning post 42 passes through the positioning hole 54. The position of the homogenizing plate 5' can thus be affixed.

With reference to FIG. 5B, in one embodiment, the bracket 4' comprises a bracket abutting surface 43. The positioning post 42 is formed on the bracket abutting surface 43. The homogenizing plate 5' comprises a plate abutting area 55. The positioning hole 54 is formed on the plate abutting area 55. The bracket abutting surface 43 abuts the plate abutting area 55. The position of the homogenizing plate 5' can thus be affixed.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An indicator module, comprising:
    a device housing, comprising a transparent window;
    a circuit board, disposed in the device housing;
    a plurality of light sources, disposed on the circuit board, wherein each light source is adapted to provide a light beam;
    a dividing structure, disposed in the device housing, wherein the dividing structure defines a plurality of divided spaces, and the divided spaces respectively correspond to the light sources; and
    a homogenizing plate, disposed in the device housing and corresponding to the divided spaces, wherein an air gap is formed between the transparent window and the homogenizing plate, the light beam enters the divided space from the light source, passes through the homogenizing plate and the air gap, and is emitted through the transparent window.

2. The indicator module as claimed in claim 1, wherein the dividing structure comprises a plurality of dividing walls, the dividing walls define the dividing spaces, the homogenizing plate covers the dividing walls, the homogenizing plate comprises a light entering surface and a light emitting surface, the light entering surface is parallel to the light emitting surface, the light emitting surface faces the transparent window, and the light entering surface faces the light sources.

3. The indicator module as claimed in claim 2, wherein the air gap is between 1 mm and 3 mm.

4. The indicator module as claimed in claim 3, wherein a distance is formed between the homogenizing plate and the light sources, and the distance is between 3 mm and 8 mm.

5. The indicator module as claimed in claim 1, wherein the homogenizing plate is disposed on the circuit board, the homogenizing plate comprises a light entering surface and a light emitting surface, the light entering surface is perpendicular to the light emitting surface, the light emitting surface faces the transparent window, and the light entering surface faces the light sources.

6. The indicator module as claimed in claim 5, wherein the dividing structure is embedded in the homogenizing plate, the homogenizing plate comprises a plurality of guiding areas and an emitting area, each guiding area is located in one of the divided spaces, the emitting area corresponds to the transparent window, and the light beam enters the guiding area inside the divided space from the light source, is emitted from the light emitting surface of the emitting area, passes through the air gap, and is emitted via the transparent window.

7. The indicator module as claimed in claim 6, wherein the homogenizing plate is located between the transparent window and the circuit board.

8. The indicator module as claimed in claim 6, wherein the circuit board is located between the transparent window and at least a portion of the homogenizing plate, the circuit board comprises a circuit board opening, and the light beam enters the guiding area inside the divided space from the light source, is emitted from the light emitting surface of the emitting area, passes through the air gap, and is emitted via the transparent window.

9. The indicator module as claimed in claim 6, wherein the homogenizing plate comprises a plurality of reflective protrusions, and the reflective protrusions are formed in the emitting area.

10. The indicator module as claimed in claim 6, wherein the air gap is between 1 mm and 3 mm.

11. The indicator module as claimed in claim 10, wherein a predetermined distance is formed between the emitting area and the light sources, and the predetermined distance is between 3 mm and 8 mm.

12. An electronic device, comprising:
a device housing, comprising a transparent window;
a circuit board, disposed in the device housing;
a plurality of light sources, disposed on the circuit board, wherein each light source is adapted to provide a light beam;
a bracket, disposed in the device housing and connected to the device housing, wherein the bracket defines a plurality of divided spaces, and the divided spaces respectively correspond to the light sources; and
a homogenizing plate, disposed in the device housing and corresponding to the divided spaces, wherein an air gap is formed between the transparent window and the homogenizing plate, the light beam enters the divided space from the light source, passes through the homogenizing plate and the air gap, and is emitted through the transparent window.

13. The electronic device as claimed in claim 12, wherein the bracket comprises a plurality of dividing walls, the dividing walls define the dividing spaces, the homogenizing plate covers the dividing walls, the homogenizing plate comprises a light entering surface and a light emitting surface, the light entering surface is parallel to the light emitting surface, the light emitting surface faces the transparent window, and the light entering surface faces the light sources.

14. The electronic device as claimed in claim 12, wherein the bracket comprises at least one positioning post, the homogenizing plate comprises at least one positioning hole, and the positioning post passes through the positioning hole.

15. The electronic device as claimed in claim 12, wherein the bracket comprises a bracket abutting surface, the positioning post is formed on the bracket abutting surface, the homogenizing plate comprises a plate abutting area, the positioning hole is formed on the plate abutting area, and the bracket abutting surface abuts the plate abutting area.

16. The electronic device as claimed in claim 13, wherein the air gap is between 1 mm and 3 mm.

17. The electronic device as claimed in claim 16, wherein a distance is formed between the homogenizing plate and the light sources, and the distance is between 3 mm and 8 mm.

18. The electronic device as claimed in claim 12, wherein the homogenizing plate is disposed on the circuit board, the homogenizing plate comprises a light entering surface and a light emitting surface, the light entering surface is perpendicular to the light emitting surface, the light emitting surface faces the transparent window, and the light entering surface faces the light sources.

* * * * *